(12) United States Patent
Fogel

(10) Patent No.: US 8,464,329 B2
(45) Date of Patent: Jun. 11, 2013

(54) SYSTEM AND METHOD FOR PROVIDING SECURITY FOR SIP-BASED COMMUNICATIONS

(75) Inventor: Richard Melvin Fogel, Toronto (CA)

(73) Assignee: Watchguard Technologies, Inc., Seattle, WA (US)

( * ) Notice: Subject to any disclaimer, the term of this patent is extended or adjusted under 35 U.S.C. 154(b) by 815 days.

(21) Appl. No.: 11/357,164

(22) Filed: Feb. 21, 2006

(65) Prior Publication Data
US 2007/0209067 A1    Sep. 6, 2007

(51) Int. Cl.
*H04L 29/00* (2006.01)
(52) U.S. Cl.
USPC ............ 726/11; 726/14; 713/154; 713/162; 380/264; 380/270
(58) Field of Classification Search
USPC ............ 726/11, 14; 713/154, 162; 380/264, 380/270; 370/356; 709/227
See application file for complete search history.

(56) References Cited

U.S. PATENT DOCUMENTS

| | | | |
|---|---|---|---|
| 6,701,160 B1 * | 3/2004 | Pinder et al. | 455/550.1 |
| 7,020,130 B2 * | 3/2006 | Krause et al. | 370/352 |
| 7,490,350 B1 * | 2/2009 | Murotake et al. | 726/11 |
| 2005/0132060 A1 * | 6/2005 | Mo et al. | 709/227 |
| 2007/0094412 A1 | 4/2007 | Sollee | |
| 2007/0121596 A1 * | 5/2007 | Kurapati et al. | 370/356 |
| 2007/0192508 A1 | 8/2007 | Sollee | |
| 2007/0201409 A1 * | 8/2007 | Kandlur et al. | 370/338 |

FOREIGN PATENT DOCUMENTS

WO    WO 02/103981 A2    12/2002

OTHER PUBLICATIONS

Kuhn, D., et al., "Security Considerations for Voice Over IP Systems," National Institute of Standards and Technology, Special Publication 800-58, Jan. 2005, pp. 1-93, Technology Administration, U.S. Department of Commerce.

* cited by examiner

*Primary Examiner* — Jeffrey Pwu
*Assistant Examiner* — Helai Salehi
(74) *Attorney, Agent, or Firm* — Kory D. Christensen; Stoel Rives LLP

(57) ABSTRACT

A security device for SIP communications operates to inhibit the effect of malicious attacks and/or inadvertent erroneous events on the provision of SIP-based services within a private network and between private and public networks. The security device acts as a conventional Firewall, NAT and PAT to isolate SIP User Agents on the private network from SIP User Agents on the public network and to Blacklist undesired callers. Also, the security device preferably includes a virus scanner to scan attachments to sessions and/or other communications to identify and block virus contaminated data and the security device includes a hardened SIP stack to scan for and detect malformed SIP messages to prevent malicious attacks and/or inadvertent erroneous messages from adversely impacting the operation of SIP services.

21 Claims, 3 Drawing Sheets

SYSTEM AND METHOD FOR PROVIDING SECURITY FOR SIP-BASED COMMUNICATIONS

FIELD OF THE INVENTION

The present invention relates to a system and method for providing security for SIP-based communications. More specifically, the present invention relates to a system and method for detecting and mitigating SIP-based security issues, such as malformed messages, spam and other security threats.

BACKGROUND OF THE INVENTION

The Session Initial Protocol (SIP) is now widely used to establish multimedia communications, such as Voice over IP (VoIP), instant messaging (IM), audio and/or video conferencing, etc. over the Internet. SIP serves as a control mechanism to establish suitable connections between end points, through the Internet, and in most cases those connections employ another protocol, such as RTP, for the actual delivery of data. Thus, typically four IP ports (two at each end) are used for a multimedia connection, such as VoIP, one port at each end for the SIP communications, which serve as a control channel, and one port at each end for the payload data.

SIP is a text-based protocol, much like HTTP and SMTP, and the security issues that have previously affected HTTP web and SMTP mail communications are now threats to SIP-based communications. Such threats include Denial of Service (DOS) attacks, spoofing, malformed messages, spam (unwanted messages), hijacking, replay, etc. and can compromise SIP-based communications.

It is also contemplated that new attacks which exploit SIP-specific weaknesses also pose a threat to SIP-based communications. For example, SIP messages can be transported over TCP or UDP protocols and, in the latter case, attacks based upon the injection of attack packets can relatively easily be created.

Traditional network firewalls can provide basic port management to enable SIP-based communications through the firewall. However, such traditional firewalls do not provide any meaningful protection for SIP-based communications from attacks such as those described above.

As SIP-based communications, especially VoIP and audio/video conferencing, become more widespread and business critical, it is desirable to be able to successfully deal with attacks on SIP-based communications. Further, as SIP-based communications become more prevalent in the business world, the likelihood of attempts to exploit SIP related security issues becomes much greater.

SUMMARY OF THE INVENTION

It is an object of the present invention to provide a novel SIP security device which obviates or mitigates at least one disadvantage of the prior art.

According to a first aspect of the present invention, there is provided a security device for SIP-based communication sessions, the security device comprising: a firewall acting between SIP user agents, services and devices on a private network and a public network, the firewall including a blacklist of undesired SIP sources which are prevented from traversing the device; a Network Address Translator and Port Address Translator operable to alter the addresses and/or ports of data traversing the security device to hide addresses and ports on the private network from the public network; a hardened SIP stack operable to examine each SIP message traversing the security device to identify malformed messages and to discard such messages; and a plurality of security processes operable to examine pre-selected SIP messages in accordance with one or more rules to prevent malicious attacks on SIP devices and/or services within the private network.

Preferably, the plurality of security processes includes a process to authenticate SIP INVITE messages and to authenticate SIP REGISTER messages. More preferably, the plurality of security processes includes processes to authenticate all SIP messages which can be authenticated (e.g. all messages but CANCEL and ACK).

According to another aspect of the present invention, there is provided a method of providing security in a network including private and public network branches and providing SIP services, the method comprising: (i) examining SIP messages received at a security device to detect and dispose of malformed messages; (ii) examining each remaining SIP messages to compare the source of the SIP message to a sources on a blacklist of sources maintained at the security device and to discard SIP messages whose source is one the blacklist; (iii) for each remaining SIP INVITE or REGISTER message discarding any message which cannot be authenticated; and (iv) for each remaining SIP message performing network address translation and/or port address translation to allow the SIP message to cross between the private network branch and the public network branch.

The present invention provides a security device for SIP communications which operates to inhibit the effect of malicious attacks and/or inadvertent erroneous events on the provision of SIP-based services within a private network and between private and public networks. The security device acts as a conventional Firewall, NAT and PAT to isolate SIP User Agents on the private network from SIP User Agents on the public network and to Blacklist undesired callers. Also, the security device preferably includes a virus scanner to scan attachments to sessions and/or other communications to identify and block virus contaminated data and the security device includes a hardened SIP stack to scan for and detect malformed SIP messages to prevent malicious attacks and/or inadvertent erroneous messages from adversely impacting the operation of SIP services.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Aspects of the present invention were described in a draft proposal by the present inventor to the Internet Engineering Task Force (IETF) entitled, "SIP Edge Proxy, draft-fogelsipping-edgeproxy.txt", dated Feb. 22, 2005. The contents of this reference are incorporated herein by reference.

Figure 1:
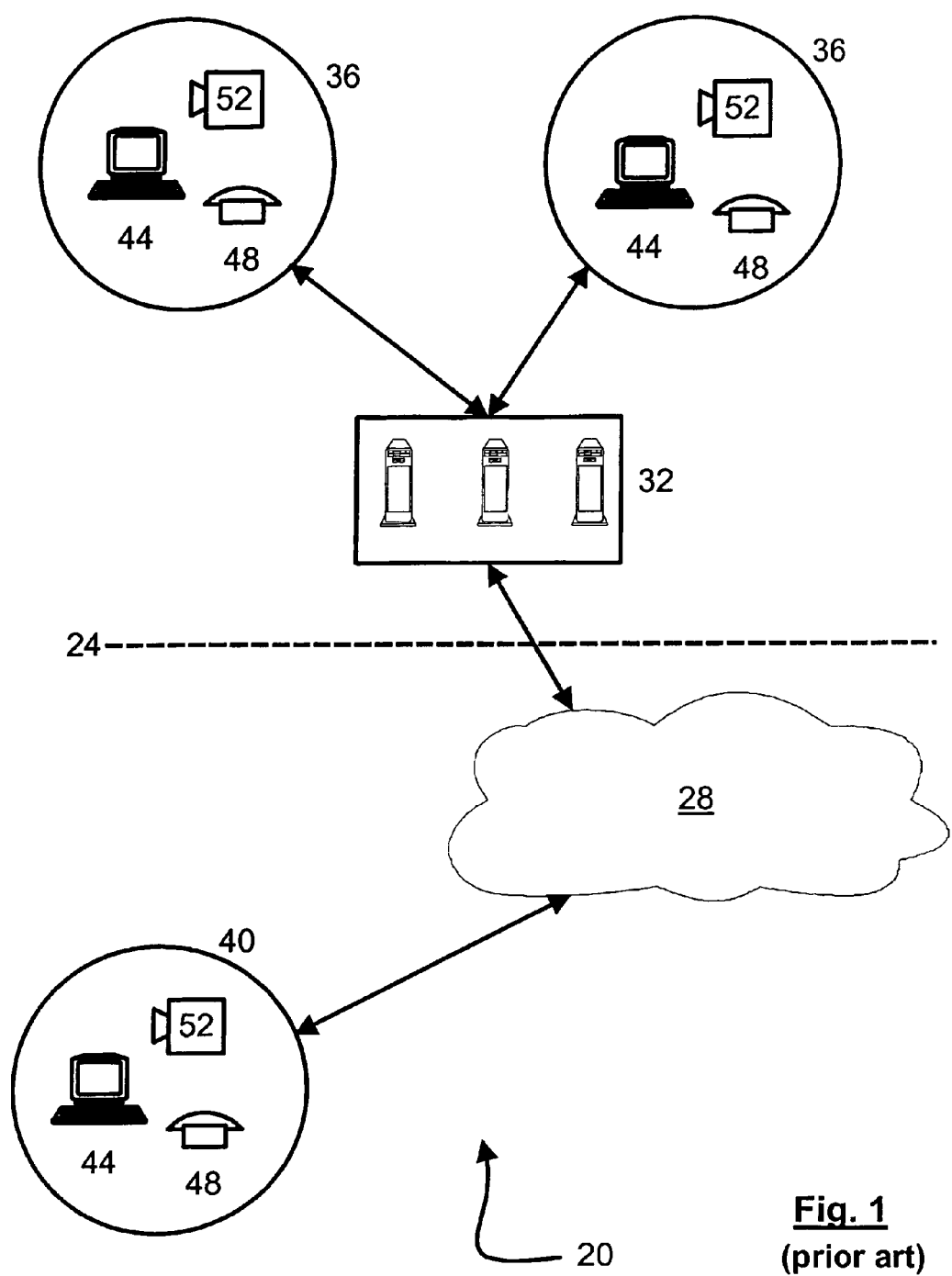
FIG. 1 shows a schematic representation of a prior art public and private network providing SIP services.

A prior art network implementing SIP-based communications is indicated generally at 20 in FIG. 1. In the Figure, devices above line 24 are internal devices employing private Internet Protocol (IP) addresses and which are interconnected by a LAN and devices below line 24 are public devices, employing public IP addresses and which are interconnected by a network, such as the Internet 28.

A set of SIP infrastructure devices 32, including a SIP Proxy/PBX, a Registrar and Redirect servers is interposed, along with a Firewall (not shown) that implements NAT functions, between the private and public networks.

A plurality of Internal SIP User Agents 36 are present in the private network, as are a plurality of External SIP User Agents 40 in the public network. While in FIG. 1 External SIP User Agents 40 are shown as being in the public network and directly connected to Internet 28, it should be apparent to those of skill in the art that External SIP User Agents 40 can instead be located in another private network, behind a set of SIP infrastructure devices similar to devices 32, connected to Internet 28 through a Firewall or other NAT device.

Each of SIP User Agents 36 and 40 can have one or more devices registered and these devices can include computing devices 44, such as a personal computer used for instant messaging (IM), a VoIP telephone 48, or a digital video camera 52.

While network 20 does allow SIP-Based communications to be effected between devices registered with Internal SIP User Agents 36 and between devices registered with Internal SIP User Agents 36 and devices registered with External SIP User Agents 40, SIP-based communications in network 20 are subject to a variety of attacks and threats as described herein. As SIP-based communications, such as VoIP telephony and/or video conferencing become increasingly important, the potential vulnerabilities of SIP-based communications become increasingly problematic.

Some of the potential exploits/attacks to which SIP systems can be vulnerable include, without limitation:

Eavesdropping: a rogue proxy can modify the SIP message body before forwarding it to the destination. By falsifying information in the message body, it can change the request method to force subsequent messages to be forwarded thorough other proxies.

Impersonation: the FROM header field can be misused for identity impersonation by changing the calling number and/or the display name.

Call Termination: by spoofing the caller's identity, an attacker can send a BYE or CANCEL message to either of the communicating parties terminating their session.

Call Hijacking: by using a third party registration, an attacker can use a REGISTER message to replace a target's address of record with the attacker's which will result in the attacker receiving the target's calls. The attacker can also send a REGISTER message to remove the target's registrations resulting in callers to the target receiving a busy signal.

Call Transferring: using REFER messages, a call in progress can be transferred to a third party, dropping one of the original participants in the call and substituting the third party. A variation is for an attacker to initiate a call causing a victim's phone to ring and then transferring the call from the attacker to a third party once the victim answers.

Resource Exhaustion: an attacker can send multiple REGISTER messages for a given URI which can overload the registrar and can result in its database crashing.

Denial of Service (DoS): an eavesdropper can send false 6xx responses (e.g. Declined or Busy) which will falsely indicate that the victim is not willing to accept calls.

Message Flooding: The victim's phone never stops ringing and the victim is unable to receive non-malicious calls.

Malformed Messages: malformed or overly large SIP messages can cause vulnerable servers and/or SIP user agents to crash or run arbitrary code.

Figure 2:
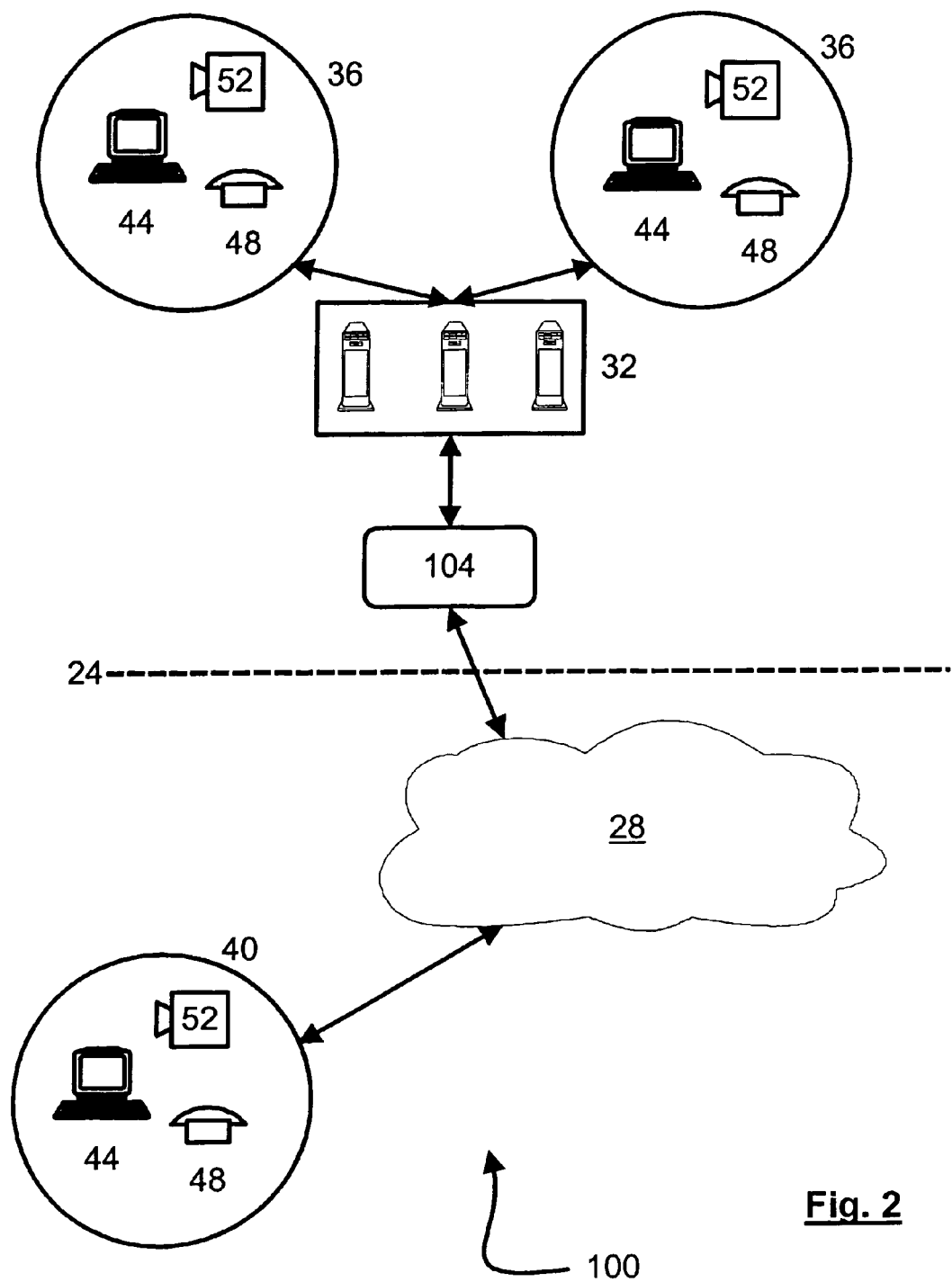
FIG. 2 shows a schematic representation of a public and private network providing SIP services with a SIP security device in accordance with the present invention.

A network implementing SIP-based communications in accordance with the present invention is indicated generally at 100 in FIG. 2, wherein like components to those of FIG. 1 are indicated with like reference numerals. In addition to the components of network 20, network 100 further includes a SIP security device 104. SIP security device 104 can be a general purpose computer, such as a personal computer with an Intel Pentium 4 processor executing the FreeBSD operating system or can be a purpose built computing device.

Figure 3:
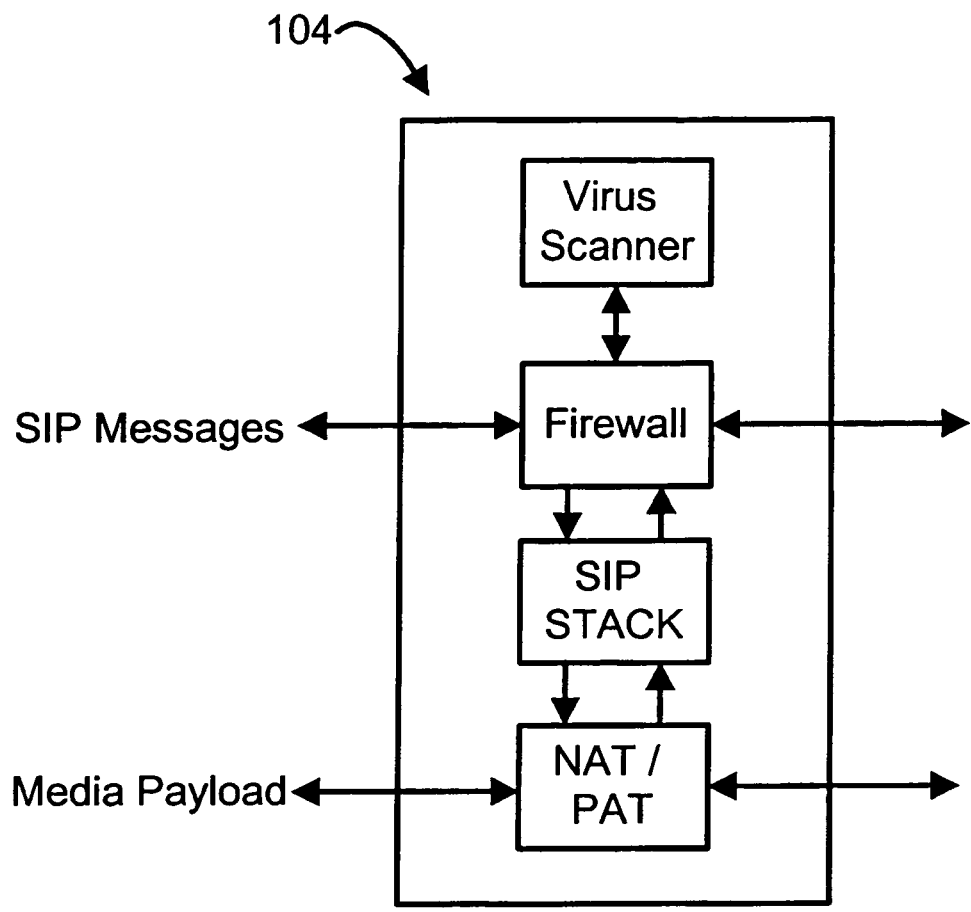
FIG. 3 shows a schematic representation of the SIP security device of FIG. 2.

As illustrated in FIG. 3, SIP security device 104 implements a Firewall process, a hardened SIP Stack process, a NAT (Network Address Translation) process and a PAT (Port Address Translation) process. Optionally, security device 104 can also implement a virus scanning process to scan attachments to SIP communications for viruses.

While SIP message and media packets between Internal SIP User Agents 36 can bypass SIP security device 104 if the caller knows the IP address of the callee, it is preferred that all SIP message and media packets be routed through SIP security device 104. All SIP messages to or from External SIP User Agents 40 must pass through SIP security device 104.

In addition to the virus scanning mentioned above and the security processes discussed below, security device 104 also manipulates fields in SIP messages and Media Packets, altering IP addresses and/or ports, to allow authorized messages and media to enter, exit and/or traverse the private network much like known firewalls and Application Layer Gateways.

The first security process performed on SIP messages received at security device 104 is to examine received SIP messages to determine if they are valid, well formed SIP messages. Malformed and/or invalid SIP messages can be used in exploits employing memory corruption or stack or buffer overflows, etc. The SIP stack process operating on security device 104 is "hardened" to allow it to parse and consider SIP messages to determine if they are malformed or invalid without falling victim to the consequences of a malformed or invalid SIP message. In particular, the parsing function of the hardened SIP stack does not assume a maximum size for headers (to inhibit buffer overflow exploits), will prevent invalid characters or syntax from causing an exception or core dump, will prevent memory over allocation and/or exhaustion by excessively long messages, etc. The hardening of a communications protocol stack, such as the SIP stack in security device 104, is well known to those of skill in the art and will not be further discussed herein.

Preferably, the hardened SIP stack performs a parsing and verification process that checks each SIP message to confirm that all required headers are present, all fields have valid syntax and that the message is of a valid length. The verification can be performed in accordance with an appropriate specification, such as RFC 3261 and/or any updates and additions there to. If desired, it is also contemplated that the parsing and verification process can perform some amount of protocol repair to correct obvious errors in a message, where the errors are recognized as being "legitimate" errors, i.e.—errors resulting from inadvertence and not malicious errors, such as an incorrect message length field, etc. If a SIP message is not a valid message, it is dropped by security device 104 and no further processing of the message occurs.

If the SIP message is determined to be a validly formed message, then it is next checked to determine whether the source IP address of the message is on a Blacklist maintained by the Firewall process at security device 104. Specifically, the Firewall process of SIP security device 104 examines received messages and evaluates the message in view of a set of Blacklist rules. These rules can include a variety of suitable conditions, including comparing the source IP address of the message to a "Blacklist" of known undesired IP addresses; comparing the caller's name to a list of Blacklisted callers; etc. A message which fails the evaluation of one or more of these rules is prevented from traversing SIP security device 104 and can either be discarded by security device 104 and/or, optionally, a suitable message indicating refusal of the message by SIP security device 104 can be sent to its source address.

It is contemplated that SIP security device 104 can also implement a set of rules to, at least partially, automatically manage the Blacklist. For example, a rule can be defined such that if the number of INVITE messages from an IP address or a domain exceeds a predefined value within a predefined time, then that address or domain is deemed to be a spam source and that address domain is placed on the Blacklist for a predefined period of time. Similar rules can be used to prevent other attacks, such as directory harvesting wherein an attacker tries different combinations of usernames and/or telephone numbers in an attempt to derive directory entries. The construction and maintenance of a Firewall Blacklist and rule system for such Blacklists are well understood by those of skill in the art and will not be described further herein.

If desired, the Firewall process can further implement a "Whitelist" against which the source IP addresses of each SIP message received at SIP Security device 104 is compared. If a received SIP message has a source address corresponding to an entry on the Whitelist, it is deemed to be from a recognized entity and can be excluded from many, or all, of the remaining security processes described below.

For example, it can be assumed that SPAM will not be received from Whitelisted addresses and so examinations of SIP messages to identify SPAM need not be performed for SIP messages from Whitelisted addresses. It is contemplated that the administrator of security device 104 can configure, as desired, the security processes applied to SIP messages from Whitelisted addresses.

It is contemplated that the addresses of Internal SIP User Agents 36 will be maintained on the Whitelist. It is further contemplated that other "friendly" addresses, such as the addresses of External SIP User Agents 40 which are located at trusted subsidiaries or branches of the entity (a business or school, etc.) operating the private network, will be maintained on the Whitelist. Further, Whitelist entries can be automatically created via an appropriate rule set, such as adding any public address successfully called from an Internal SIP User Agent 36 to the Whitelist. Again, the construction and maintenance of a Firewall Whitelist is well understood by those of skill in the art and will not be described further herein.

Security device 104 can also enforce predefined admission control policies which, for example, limit the total number of simultaneous sessions permitted, the amount of bandwidth utilized, the number of sessions for each media type (e.g.—voice call, instant messaging, etc.) and the ability to preemptively make some calls, such as emergency (eg.—911) or high value calls. When security device 104 receives an INVITE message which passes the security processed discussed below, the SDP information attached to that INVITE message specify the codec and/or bandwidth that are requested for that session. Security device 104 evaluates those requirements in view of the established admission control policies and determines if the session can be established in view of the current utilization of resources. If adding the new session would violate one or more admission policies, the session is refused and an appropriate Service Unavailable Message is returned to the requesting originator.

A validly formed SIP message from a non-Blacklisted source is next examined by the hardened SIP stack of security device 104. In particular, and as described below, REGISTER, INVITE, CANCEL, BYE, REFER, ACK and OK messages are processed by the security processes of a present implementation of security device 104, although other messages can be considered and processed if necessitated by new exploits and/or changes to the SIP protocol, as will be apparent to those of skill in the art.

Where appropriate, SIP message are authenticated by the security processes executing on security device 104. The authentication process employed varies depending upon the location of the sender of the SIP message, i.e.—within the private network or within the public network SIP messages from within the private network (i.e.—"internal" SIP User Agents) can be authenticated using the Digest Authentication provided within the SIP protocol. While digest-based authentication does work, it is subject to several potential attacks, including offline dictionary attacks. Such attacks can be mitigated by using TLS (Transport Layer Security) to secure the connection between the Internal SIP User Agent 36 and security device 104 although the high overhead (both network capacity and CPU processing cycles required at the SIP device) associated with TLS connections can make this problematic.

It is also contemplated that, in some circumstances, enough information will be available to security device 104 to authenticate SIP user agents within the public network. For example, if the entity using the private network has a branch or associated entity with SIP user agents on the public network, the database of that branch or associated entity can be replicated within the private network to allow security device 104 to perform authentication for messages from these SIP User Agents.

SIP messages from other sources on the public network which are known to authenticate their users can use the SIP identity mechanism, as described in "Enhancements for Authenticated Identity Management in the Session Initiation Protocol (SIP), draft-ietf-sip-identity-04", by J. Peterson, February 2005, to assert the identity of the sender and include a signature to validate that assertion. For messages from SIP User Agents on the public network that are not subject to authentication by the SIP identity mechanism, an appropriate policy can be defined. In a presently preferred embodiment of the present invention, this policy only allows messages from such SIP User Agents when the SIP User Agent is included on a list, maintained for security device 104, of trusted, or known, senders.

It is also contemplated that, for SIP user agents on the public network and which cannot otherwise be authenticated, it is possible to provide a measure of the caller's reputation by using a process similar to the Sender Permitted Form (SPF) process used for email communications. In this case, a reverse DNS lookup is performed on the caller's IP address to ensure that the server which sent the message is listed by the domain as an authorized sender of SIP messages.

In a presently preferred configuration, INVITE, REGISTER, REFER and BYE messages from Internal SIP User Agents 36 are authenticated by security device 104.

For INVITE messages, in addition to authenticating the INVITE message, security device 104 preferably also sets the FROM header of the INVITE message with the data stored in the subscriber database. This prevents a caller from impersonating another user in the user name of the call display of the recipient of the call. Further, once security device 104 has authenticated an INVITE message for a session, it continues to check that all subsequent messages for that session originate from the same IP address as the authenticated INVITE message. Amongst other things, this will prevent an attacker from sending a CANCEL message (which can not be authenticated) to improperly terminate the session.

For REGISTER messages, in addition to authenticating the REGISTER message, each REGISTER message is checked against a set of security rules which can include, without limitation: a rule requiring that the user originating the REGISTER message can only register his own SIP address, to prevent third party registrations; a rule denying any REGISTER message attempting to de-register all devices currently registered for the user; a rule limiting the total number of devices which can be registered for the user; a rule preventing the appearance of the server's IP address in the REGISTER message's Contact field to prevent an attacker from invoking an "endless loop" attack; etc.

For REFER messages, the REFER message is authenticated to prevent an attacker from transferring an in progress session to a third party device or forcing a victim's phone or other device to make a call session to a third party.

For BYE messages, the BYE message is authenticated to prevent an attacker from terminating an in progress session and/or initiating a Denial of Service attack.

ACK messages are not generally processed as part of the security processes, but are examined as part of the NAT process. Specifically, ACK messages may include the caller's session parameters (e.g.—port, media type, etc.) which the NAT process utilizes. Similarly, OK messages are generally not examined as part of the security processes but are examined as part of the normal three-way handshake initiating a session. A caller proposes preferences in the INVITE message, the callee replies with an acceptance in an OK message and the caller confirms with an ACK.

Another security process executing at security device 104 is the NAT/PAT process. The NAT/PAT process opens "pinholes" for the RTP (media payload) traffic once a SIP session is successfully set up. When security device 104 receives an RTP packet, it checks that there is currently a SIP session in progress between the indicated sender and destination and only forwards the packet if this is true. Also, before forwarding RTP packets which have passed the preceding test, the parser of the NAT/PAT process examines each RTP packet to verify that they are correctly formed, in accordance with an appropriate specification such as IETF RFC 1889. RTP packets which are not correctly formed are dropped by security device 104.

In summary, security device 104 acts: as a conventional Firewall, NAT and PAT to isolate Internal SIP User Agents 36 on the private network from external SIP User Agents on the public network and to Blacklist undesired callers; also as, preferably, a virus scanner, scanning attachments to sessions and/or other communications to identify and block virus contaminated data; a detector for malformed SIP messages preventing malicious attacks and/or inadvertent erroneous messages from adversely impacting the operation of SIP services; and as an admission controller to manage resources of the private network.

Security device 104 operates to inhibit the effect of malicious attacks and/or inadvertent erroneous events on the provision of SIP-based services within a private network and between private and public networks.

The above-described embodiments of the invention are intended to be examples of the present invention and alterations and modifications may be effected thereto, by those of skill in the art, without departing from the scope of the invention which is defined solely by the claims appended hereto.

I claim:

1. A security device for SIP-based communication sessions, the security device comprising:

a firewall acting between SIP user agents, services and devices on a private network and a public network, the firewall including a blacklist of undesired SIP sources which are prevented from traversing the security device;

a Network Address Translator and Port Address Translator to alter the addresses and/or ports of data traversing the security device to hide addresses and ports on the private network from the public network;

a hardened SIP stack operable to examine all SIP messages traversing the security device to identify malformed messages and to discard said malformed messages;

an admission control process to identify a resource requested for use by an external user agent in a session to be established by a selected SIP message traversing the security device, wherein the requested resource is identified using resource request information in the selected SIP message, and to determine whether to refuse the session before the session is established based on the identified resource and a current resource utilization; and a plurality of security processes to examine pre-selected SIP messages in accordance with one or more rules to prevent malicious attacks on SIP devices and/or services within the private network.

2. A security device according to claim 1 wherein the plurality of security processes includes a process to authenticate SIP INVITE messages.

3. A security device according to claim 1, wherein the requested resource is identified using Session Description Protocol (SDP) information associated with the selected SIP message.

4. A security device according to claim 1, wherein the hardened SIP stack is to repair a malformed message when it is determined that the malformed message is malformed due to a non-malicious error, and wherein the repaired message is not discarded as a malformed message.

5. A security device according to claim 1, wherein a IP source is automatically added to the blacklist responsive to detecting a threshold number of SIP request messages from the SIP source within a threshold time period.

6. A security device according to claim 1, wherein the firewall comprises a whitelist identifying SIP sources that are allowed to traverse the security device, and wherein all of the SIP user agents in the private network are included in the whitelist.

7. A security device according to claim 1, wherein the Network Address Translator and Port Address Translator is to identify malformed Real-time Transport Protocol (RTP) messages by comparing a format of the RTP messages to a message specification and is to discard RTP messages identified as being malformed.

8. A security device according to claim 1, wherein the Network Address Translator and Port Address Translator is to determine whether incoming Real-time Transport Protocol (RTP) messages are associated with a SIP session and is to discard RTP messages that are not associated with a SIP session.

9. A security device according to claim 1, further comprising a virus scanner to scan incoming SIP and Real-time Transport Protocol (RTP) messages for malicious content and to discard SIP and/or RTP messages identified as comprising malicious content.

10. A security device according to claim 1, wherein a first one of the plurality of security processes associates a SIP INVITE message from a SIP source with a session, and wherein the first security process discards subsequent SIP messages associated with the session that are not from the SIP source.

11. A security device according to claim 1, wherein the security device populates a FROM header of an outbound SIP message originating from a SIP user agent in the private network with data from a subscriber database.

12. A security device according to claim 1, wherein the security device is to discard incoming SIP REGISTER messages having a contact field comprising an address of the security device.

13. A security device according to claim 1, wherein the admission control process identifies the resource requested by the session using a codec specified in a SIP INVITE message.

14. A security device according to claim 1, wherein the admission control process identifies the resource requested by the session using a bandwidth specified in a SIP INVITE message.

15. A security device according to claim 2 wherein the plurality of security processes includes a process to authenticate SIP REGISTER messages.

16. A security device according to claim 5, wherein a domain of a SIP source is automatically added to the blacklist responsive to detecting a threshold number of SIP request messages from SIP sources in the domain within a threshold time period.

17. A security device according to claim 5, wherein the SIP source address is added to the blacklist for a pre-determined time period and is removed from the blacklist when the pre-determined time period expires.

18. A security device according to claim 6, wherein a SIP source in the public network is automatically added to the whitelist responsive to determining that a communication request originating from a SIP user agent in the private network was successfully received at the SIP source in the public network.

19. A security device according to claim 15 wherein the firewall automatically adds SIP sources which violate at least one predefined rule to the blacklist of undesired SIP sources.

20. A method of providing security in a network including private and public network branches and providing SIP services, the method comprising:
    examining SIP messages received at a security device to detect and dispose of malformed SIP messages;
    examining each remaining SIP message to compare a source of the SIP message to a source on a blacklist of sources maintained at the security device and to discard SIP messages whose source is on the blacklist;
    identifying a resource requested for use by an external user agent in a session to be established by a selected SIP message, wherein the resource is identified using resource request information in the selected SIP message, determining whether to refuse the session before the session is established based on the identified resource, current resource utilization, and an admission control policy; and
    for each remaining SIP message performing network address alteration and/or port address alteration to hide addresses and ports on the private network branch from the public network branch.

21. A method of providing security for communications sessions established using Session Initiation Protocol (SIP), comprising:
    receiving at a computing device incoming SIP messages sent from SIP sources in a public network to SIP user agents in a private network;
    the computing device discarding each SIP message that originates from a SIP source that is on a blacklist; and
    for each incoming SIP INVITE message, identifying at the computing device a resource requested for use by an external user agent in a session to be established by the SIP INVITE message using resource request information in the SIP INVITE message, and
    the computing device determining whether to refuse the session before the session is established based on the identified resource requested by the session, a current resource utilization level, and a pre-defined admission policy.

* * * * *